United States Patent [19]

Ostrom

[11] Patent Number: 5,080,290
[45] Date of Patent: Jan. 14, 1992

[54] WATER INLET FOR A LINEAR MOVE IRRIGATION SYSTEM

[76] Inventor: Carl R. Ostrom, 1822 N. 78th St., Omaha, Nebr. 68114

[21] Appl. No.: 503,713

[22] Filed: Apr. 3, 1990

[51] Int. Cl.$^5$ ............................................. A01G 25/09
[52] U.S. Cl. ................................... 239/724; 239/740
[58] Field of Search ........................ 239/724, 740, 749

[56] References Cited

U.S. PATENT DOCUMENTS

| | | | |
|---|---|---|---|
| 2,249,130 | 7/1941 | Gunther | 239/724 |
| 2,718,433 | 4/1955 | Poyner et al. | 239/724 |
| 3,009,645 | 11/1961 | Nugent | 239/724 |
| 3,047,236 | 7/1962 | Fahrner | 239/724 |
| 3,108,440 | 10/1963 | Anderson | 239/724 |
| 3,726,478 | 4/1973 | McMurray | 239/724 |
| 4,384,676 | 5/1983 | Zimmerer et al. | 239/724 |

FOREIGN PATENT DOCUMENTS

| | | | |
|---|---|---|---|
| 917802 | 4/1982 | U.S.S.R. | 239/724 |
| 976907 | 12/1982 | U.S.S.R. | 239/724 |

*Primary Examiner*—Andres Kashnikow
*Assistant Examiner*—Lesley D. Morris
*Attorney, Agent, or Firm*—Zarley, McKee, Thomte, Voorhees & Sease

[57] ABSTRACT

A water inlet for a linear move irrigation system wherein the water inlet is supported upon a wheeled frame which travels along the bottom of an irrigation ditch adjacent one side thereof. The water inlet is fluidly connected to the end most support tower by a plurality of jointed pipes arranged such that the water inlet may be raised out of the irrigation ditch at times. The jointed connection of the pipes permits the water inlet to vertically move relative to the support tower to compensate for vertical differences in the irrigation ditch and the cart path upon which the support tower travels.

8 Claims, 6 Drawing Sheets

WATER INLET FOR A LINEAR MOVE IRRIGATION SYSTEM

BACKGROUND OF THE INVENTION

This invention relates to a linear move irrigation system and more particularly to a water inlet for a linear move irrigation system.

Linear move irrigation systems such as disclosed in U.S. Pat. No. 4,172,551, the disclosure of which is incorporated herein by reference thereto to complete this disclosure, generally comprises an elongated water conduit which extends over the field to be irrigated and which is supported by a series of support towers spaced along the length thereof. Each of the support towers is self-propelled so that the conduit may be moved across the field to be irrigated. The linear move irrigation system such as disclosed in the '551 patent normally obtains the water therefor from a canal or ditch which extends along one side of the field. Normally, a road or cart path is provided along the length of the canal adjacent thereto with the endmost support tower traveling along the road or cart path. Normally, a water inlet pipe or hose is operatively connected to the support tower positioned on the road with one end of the water inlet pipe being positioned in the canal so that water may be drawn into the system.

In the United States, the road adjacent the canal is normally located at the same elevation as the top of the canal or slightly below the road so that very little vertical movement of the water inlet pipe is required to compensate for vertical elevational differences between the road and the canal as the endmost support tower moves along the road. However, in some foreign countries, the vertical distance between the top of the canal and the road may vary considerably such that the surface of the road may be 1.5 meters above the canal in some locations and may be located 1.5 meters below the canal in other locations. A further complicating fact is that there may very well be a second linear move irrigation system on the opposite side of the irrigation canal which is also moving along the canal so it is necessary that some means be provided to enable the respective systems to meet and pass one another, if necessary.

It is therefore a principal object of the invention to provide an improved water inlet for a linear move irrigation system.

A further object of the invention is to provide a linear move irrigation system having an inlet pipe means associated o therewith including means for permitting the water inlet pipe to move vertically with respect to the support tower nearest the canal to compensate for elevational differences between the canal and the road surface upon which the endmost support tower is traveling.

Still another object of the invention is to provide a linear move irrigation system including a water inlet pipe having means associated therewith for raising the water inlet pipe out of the canal at times to permit the water inlet pipe to be passed over a gate or the like located in the irrigation canal.

Still another object of the invention is to provide a linear move irrigation system having a water inlet pipe means associated therewith including means for yieldably urging the water inlet pipe means towards one side of the irrigation canal.

Still another object of the invention is to provide a linear move irrigation system having a wheeled water intake pipe means.

Yet another object of the invention is to provide a linear move irrigation system including a wheeled water inlet pipe and float means associated therewith for counteracting the weight of the water in the water inlet pipe so that the inlet pipe may be more easily urged towards the side of the irrigation canal.

These and other objects of the present invention will be apparent to those skilled in the art.

SUMMARY OF THE INVENTION

A water inlet pipe for a linear move irrigation system is described which has the ability to compensate for relative vertical elevational differences between the irrigation canal extending along the length of the field to be irrigated and the roadway adjacent thereto upon which one of the support towers travels. An elongated pipe extends transversely outwardly from the support tower and has a second pipe secured to the outer end thereof by means of a flex joint to permit the second pipe to be pivoted above vertical and horizontal axes with respect to the first pipe. The second pipe normally extends downwardly from the outer end of the first pipe in a direction generally parallel to the length of the ditch. An elongated wheeled inlet pipe is secured to the end of the second pipe by means of a flex joint with the length of the inlet pipe being disposed parallel to the longitudinal axis of the irrigation ditch. The inlet pipe is supported by wheels and floats. The inlet pipe is yieldably urged towards the side of the ditch nearest the roadway so that linear move systems may be located on opposite sides of the irrigation ditch with the inlet pipes thereof having the ability to meet, and pass, in the ditch without any interference from the other inlet pipe. A winch means is provided on the support tower for raising the inlet pipe out of the ditch at times to permit the inlet pipe means to be moved over a gate or the like located in the irrigation ditch.

DESCRIPTION OF THE PREFERRED EMBODIMENT

Figure 1:
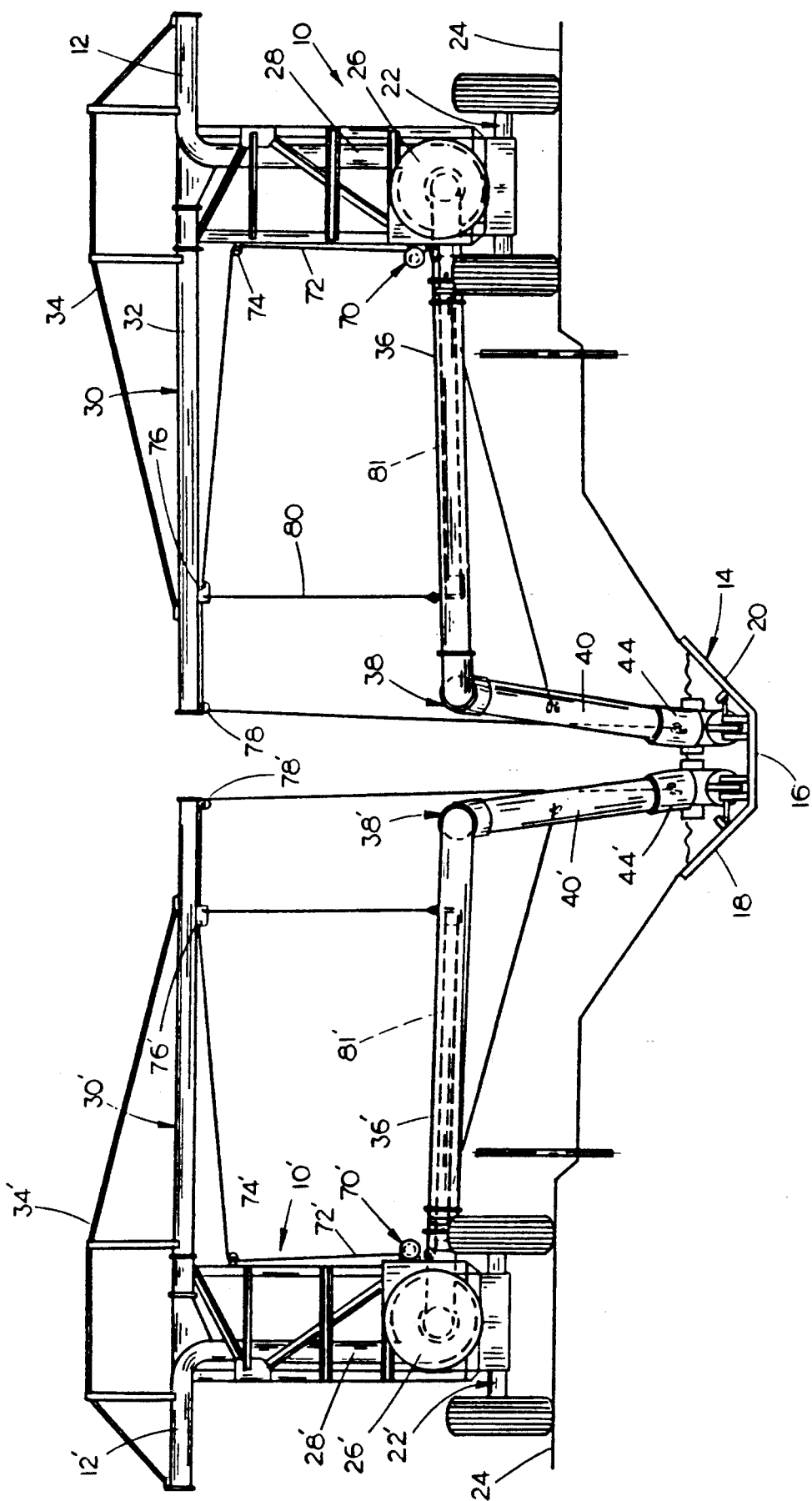
FIG. 1 is a partial side view of a pair of linear move irrigation systems positioned on opposite sides of an irrigation canal or ditch.
Figure 2:
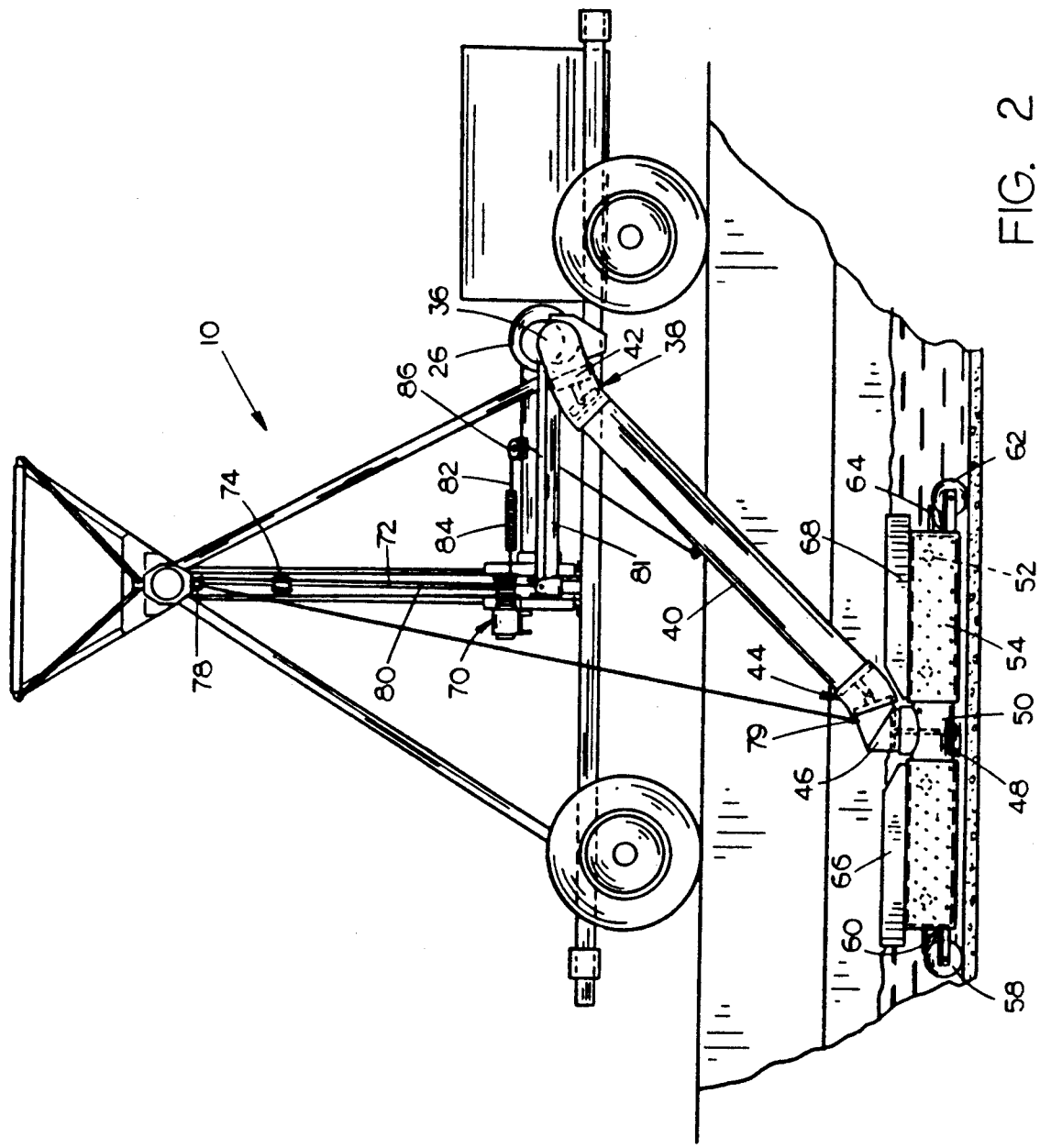
FIG. 2 is an end view of the right-hand irrigation system of FIG. 1.

Referring to FIG. 1, the numeral 10 refers generally to an end support tower having a water conduit 12 extending therefrom which would be connected to the main water conduit extending over the field to be irrigated such as in U.S. Pat. No. 4,172,551. U.S. Pat. No. 4,172,551 is relied upon herein to complete the details of the linear move irrigation system. The main water conduit is supported by a plurality of self-propelled support towers in conventional fashion and would be propelled along the length of the field in conventional fashion. The instant invention relates to the means by which the water or other liquid is drawn from an irrigation canal or ditch 14 1 having a bottom 16 and opposite sides 18 and 20. As seen in Figure water from the irrigation ditch 14 may be withdrawn therefrom by the end tower 10' of a second linear move irrigation system located on the opposite side of the irrigation ditch.

Figure 4:
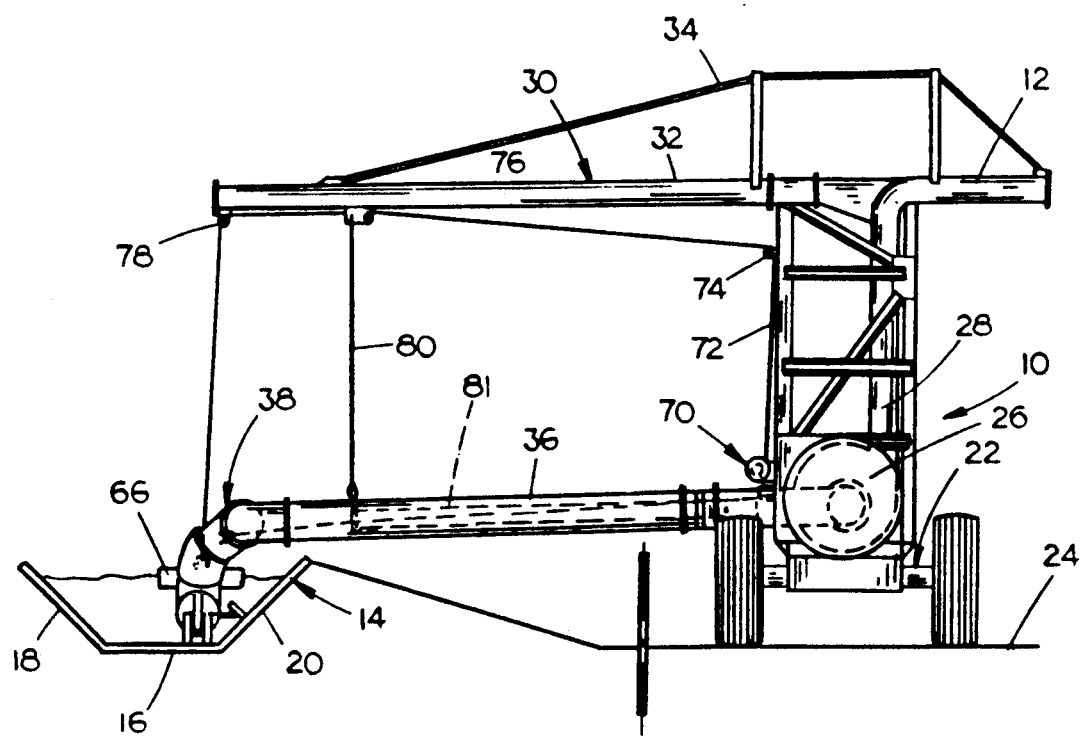
FIG. 4 is a view similar to FIG. 3 except that the roadway is shown as being located beneath the upper end of the irrigation ditch.
Figure 5:
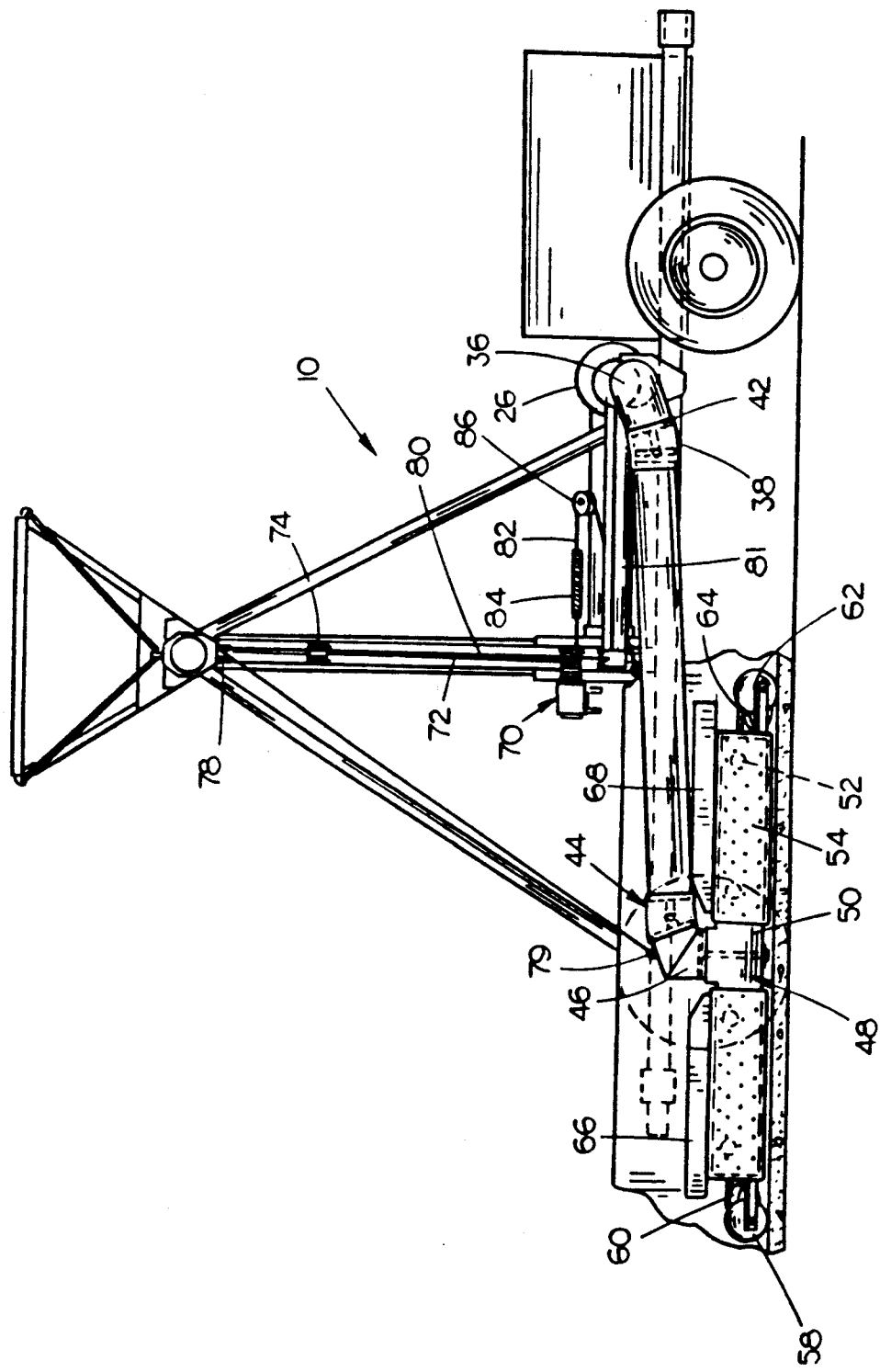
FIG. 5 is a view similar to FIG. 2 except that the roadway is shown as being located at a level below that of the top of the irrigation ditch.
Figure 6:
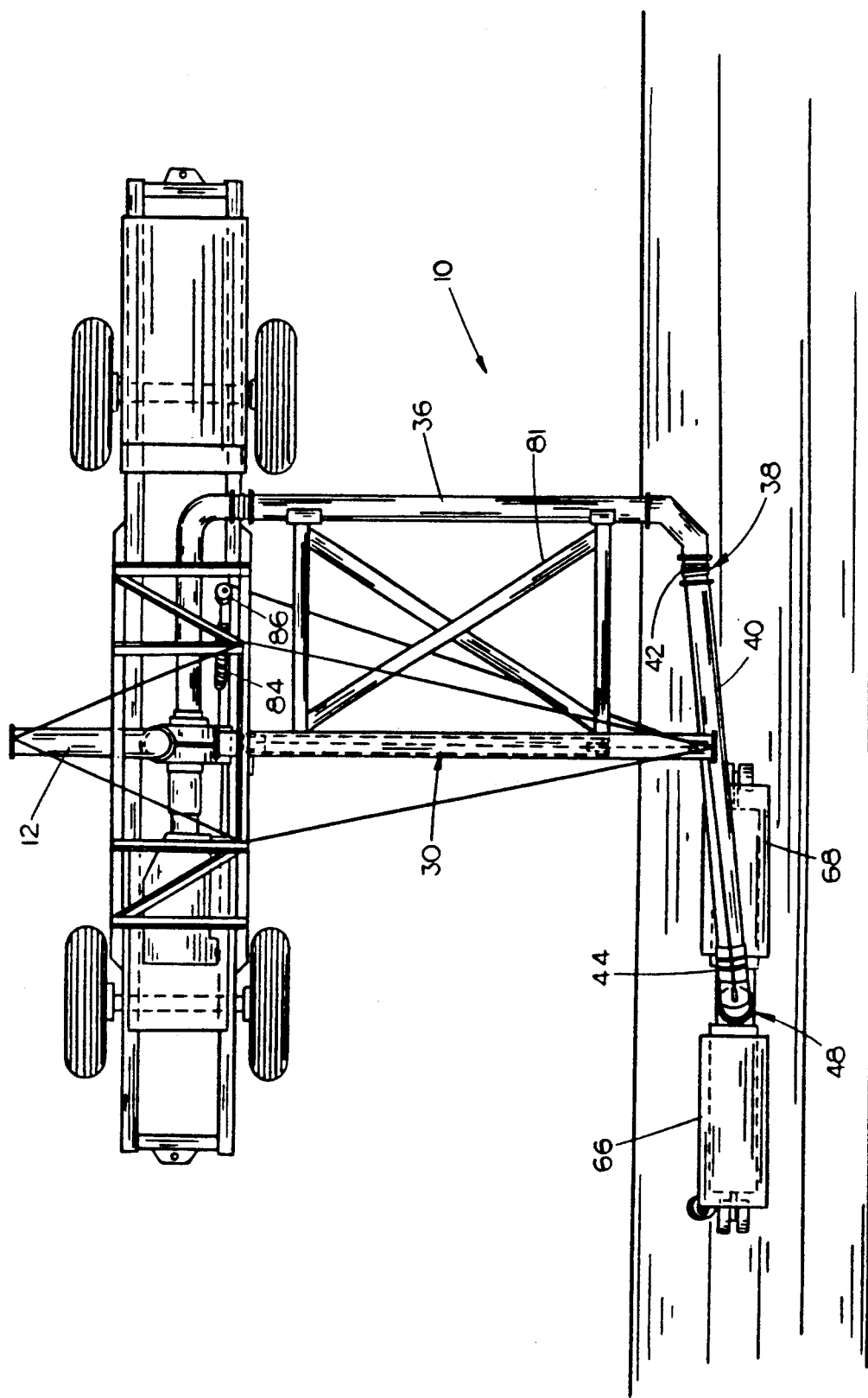
FIG. 6 is a top view of a portion of the system.

Support tower 10 includes a wheeled frame means 22 adapted to move along the roadway or cart path referred to generally by the reference numeral 24 and which is positioned laterally of the irrigation ditch 14. As seen in FIG. 1, in some cases the roadway 24 is located above the upper end or top of the ditch 14 or may be located below the end or top of the irrigation ditch as illustrated in FIG. 4. Support tower 10 is provided with a conventional water pump 26 which is operated by a conventional o power means such as an electric motor or gasoline or diesel engine. Pipe stub 28 extends from the discharge side of the pump 26 to the conduit 12.

Support tower 10 includes an overhead support structure referred to generally by the reference numeral 30 and which includes an elongated support 32 which extends laterally from the support tower 10 and which is supported by a truss arrangement 34.

Pipe 36 extends from the intake side of the pump 26 and is provided with flex joint 38 at the end thereof to permit the pipe 40 to be pivotally connected thereto about horizontal and vertical axes. The flex joint 38 includes a sealing boot 42 positioned around the gimbal ring connection.

Figure 7:
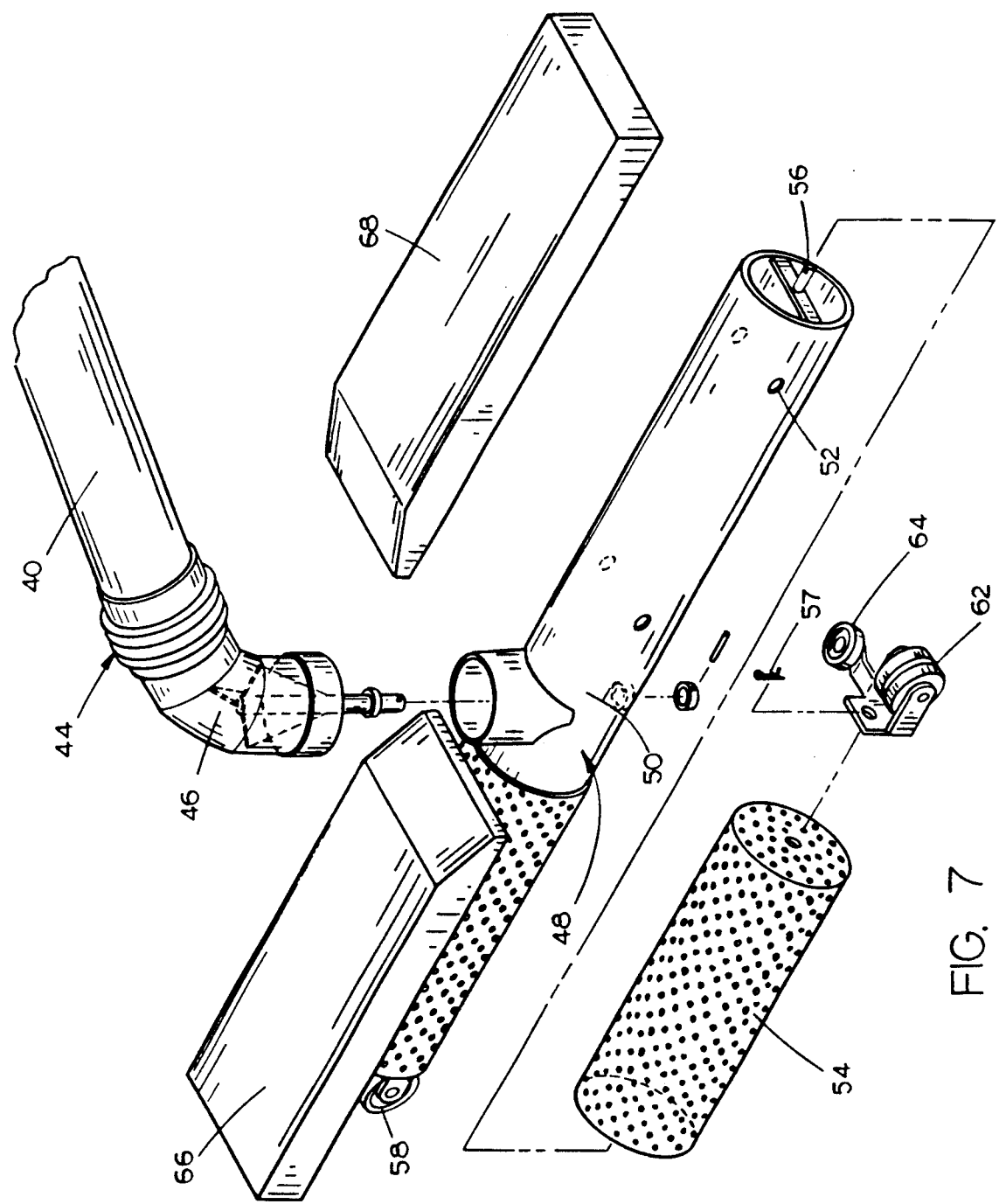
FIG. 7 is an exploded perspective view of the inlet pipe.

Flex joint 44 pivotally connects the other end of the pipe 40, about a horizontal axis, to pipe or elbow portion 46 of inlet pipe 48. A longitudinally extending pipe portion 50 is pivotally secured to pipe portion 46 about a vertical axis and has a plurality of holes 52 formed therein. A pair of perforated screens 54 are positioned on opposite ends of the pipe portion 50 and are maintained thereon by means of the pin 56 and key 57 illustrated in FIG. 7. A pair of wheels 58 and 60 are secured to one end of pipe 50 while a pair of wheels 62 and 64 are secured to the other end of pipe 50. Wheels 58 and 62 are adapted to roll upon the bottom of the ditch while wheels 60 and 64 are adapted to engage the side of the ditch as seen in FIG. 1. A pair of floats 66 and 68 are secured to the screens 54 to compensate for some of the weight of the water in the inlet pipe so that the inlet pipe may be urged more easily towards the side of the ditch nearest the support tower as will be described in more detail hereinafter.

Figure 3:
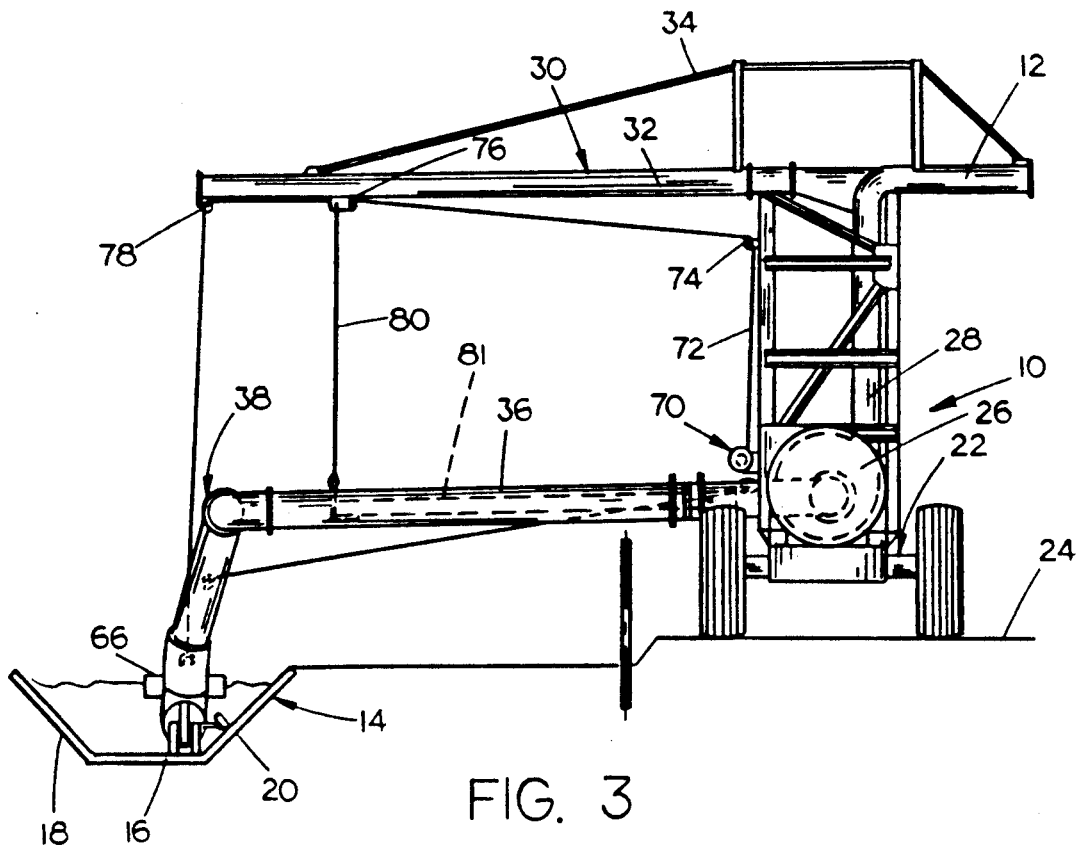
FIG. 3 is a partial side view similar to FIG. 1 except that the relative distance between the roadway and the top of the ditch is less than that shown in FIG. 1.

The numeral 70 refers to a winch means 70 having a cable 72 extending therefrom which passes over pulleys 74, 76 and 78 as seen in FIG. 3. The free end of cable 72 is secured to the water inlet pipe at 79 so that the water inlet pipe may be raised out of the ditch at times to permit the water inlet pipe to be moved over obstructions such as gates located in the irrigation ditch. Cable 80 extends between the support means 32 and the support frame 81 to limit the downward movement of the pipe 36 and support frame 81 while permitting the pipe 36 to move upwardly towards the support means 32 at times. Support frame 8 is pivotally secured to tower 12 at its inner end and is secured to pipe 36 at is other end.

Cable 82 is secured to spring 84 and passes over and around pulley 86. The other end of cable 82 is secured to the pipe 40 for yieldably urging the inlet pipe means toward the side of the ditch nearest the support tower so that the inlet pipes of a pair of systems may pass one another as illustrated in FIG. 1.

Thus, the inlet pipe means, through its flex joint connections, may move vertically relative to the support tower 10 such as when the road surface 24 is located some distance above the upper end of the ditch as illustrated in FIG. 1 and to pivotally move to the position illustrated in FIG. 4 when the road surface 24 is located below the upper end of the irrigation ditch. The winch provided on the apparatus also permits the inlet pipe means to be raised out of the canal at times as previously described.

The provision of the spring 84 ensures that the inlet pipe means will be positioned closely adjacent the side of the ditch closest to the support tower 10 as illustrated in FIG. 1 to enable the systems to pass one another as previously described. The floats located on the inlet pipe 50 compensate for the weight of the water in the inlet pipe so that the spring 84 may more easily move the water inlet pipe adjacent the side 20 as illustrated in FIG. 1.

Although the invention has been described as being ideally suited for use at one side of an irrigation canal with the end support tower being the "feed" tower, it is envisioned that in some instances, the irrigation system could straddle the irrigation canal with the "feed" tower being intermediate of the system.

Thus it can be seen that the invention accomplishes at least all its stated objectives.

I claim:

1. A linear move irrigation system for irrigating a field comprising a conduit extending transversely from an elongated irrigation canal extending lengthwise adjacent the field, said canal including a bottom and opposite sides, said conduit supported above the ground by a series of support towers each having drive means associated therewith, a series of water dispensers located along the length of the conduit for dispensing water fed through the conduit to the field, the support tower nearest the irrigation canal adapted to move along a road adjacent the irrigation canal and having an inlet pipe means extending therefrom which is in fluid communication with the irrigation canal, said inlet pipe means also being in fluid communication with the conduit whereby water in the irrigation canal may be fed to the conduit, and means for pivotally supporting said inlet pipe means whereby said inlet pipe means may vertically move with respect to said nearest support tower to compensate for variations in the relative elevation between the road and the irrigation canal.

2. The irrigation system of claim 1 wherein said means for pivotally supporting said inlet pipe means permits said inlet pipe means to travel along the bottom of the canal regardless of the relative elevation between the road and the irrigation canal.

3. The irrigation system of claim 1 wherein a winch means is operatively connected to said inlet pipe means for raising said inlet pipe means relative to said irrigation canal at times.

4. The irrigation system of claim 2 wherein means is provided for yieldably urging said inlet pipe means towards the side of the canal nearest said support tower.

5. The irrigation system of claim 1 wherein said inlet pipe means comprises an elongated, longitudinally extending inlet pipe operatively connected to said conduit.

6. The irrigation system of claim 5 wherein a wheel means supports said inlet pipe in said canal.

7. The irrigation system of claim 6 wherein a float means is secured to said inlet pipe means.

8. A linear move irrigation system for irrigating a field comprising a conduit extending transversely with respect to an elongated irrigation canal extending lengthwise adjacent the field, said canal including a bottom and opposite sides, said conduit supported above the ground by a series of support towers each having drive means associated therewith, a series of water dispensers located along the length of the conduit for dispensing water fed through the conduit to the field, one of the said support towers positioned adjacent the irrigation canal adapted to move along a road adjacent the irrigation canal and having an inlet pipe means extending therefrom which is in fluid communication with the irrigation canal, said inlet pipe means also being in fluid communication with the conduit whereby water in the irrigation canal may be fed to the conduit, and means pivotally supporting said inlet pipe means whereby said inlet pipe means may vertically move with respect to said one support tower to compensate for variations in the relative elevation between the road and the irrigation canal.

* * * * *